United States Patent
Tyrrell

(10) Patent No.: US 8,052,158 B2
(45) Date of Patent: Nov. 8, 2011

(54) SHOPPING CART

(76) Inventor: Bruce M. Tyrrell, Fort Lauderdale, FL (US)

( * ) Notice: Subject to any disclaimer, the term of this patent is extended or adjusted under 35 U.S.C. 154(b) by 120 days.

(21) Appl. No.: 12/231,837

(22) Filed: Sep. 5, 2008

(65) Prior Publication Data
US 2010/0059946 A1 Mar. 11, 2010

(51) Int. Cl.
*B62B 3/02* (2006.01)
*B62B 3/00* (2006.01)

(52) U.S. Cl. ......... 280/33.992; 280/33.991; 280/33.997; 280/35; 280/639; 280/47.35; 280/79.3

(58) Field of Classification Search ............. 280/33.991, 280/33.992, 33.997, 628, 35, 639, 651, 47.34, 280/47.35, 79.11, 79.2, 79.3
See application file for complete search history.

(56) References Cited

U.S. PATENT DOCUMENTS

| | | | |
|---|---|---|---|
| 2,662,661 A | 12/1953 | Goldman | |
| 2,689,133 A | 9/1954 | Goldman | |
| 2,845,729 A | 8/1958 | Baumgart | |
| 3,052,484 A | 9/1962 | Huffman et al. | |
| 3,297,108 A * | 1/1967 | Davis | 280/33.995 |
| 3,534,973 A * | 10/1970 | Virgle | 280/33.992 |
| 3,614,133 A | 10/1971 | Ganci | |
| 3,645,554 A | 2/1972 | Von Stein et al. | |
| 3,993,319 A * | 11/1976 | Day | 280/33.992 |
| 4,118,044 A * | 10/1978 | Celms | 280/33.995 |
| 4,123,077 A | 10/1978 | Joseph | |
| 4,248,441 A | 2/1981 | Joseph | |
| 4,376,502 A | 3/1983 | Cohen | |
| 4,423,882 A * | 1/1984 | Stover et al. | 280/33.993 |
| 4,679,818 A | 7/1987 | Kakavas | |
| 4,754,885 A * | 7/1988 | Rich | 211/132.1 |
| 4,875,695 A * | 10/1989 | Badger et al. | 280/33.993 |
| 5,002,292 A | 3/1991 | Myers | |
| 5,324,055 A | 6/1994 | Trubiano | |
| 5,366,123 A | 11/1994 | Range | |
| 5,385,358 A * | 1/1995 | Adamson | 280/33.995 |
| 5,429,377 A | 7/1995 | Duer | |
| 5,505,472 A * | 4/1996 | Trubiano | 280/33.993 |
| D400,479 S | 11/1998 | Kern et al. | |
| D400,678 S | 11/1998 | Clark et al. | |
| 6,193,246 B1 * | 2/2001 | Ondrasik | 280/33.995 |
| 6,641,147 B2 | 11/2003 | Werner | |
| 7,185,898 B2 | 3/2007 | Cote et al. | |
| 7,306,244 B2 | 12/2007 | Roseman et al. | |
| 7,396,025 B2 | 7/2008 | Ondrasik | |
| 2005/0212234 A1 * | 9/2005 | McFarland | 280/33.992 |
| 2005/0263969 A1 * | 12/2005 | Cote et al. | 280/33.992 |
| 2005/0275177 A1 | 12/2005 | Buckley, III | |

* cited by examiner

Primary Examiner — J. Allen Shriver, II
Assistant Examiner — Bryan Evans
(74) Attorney, Agent, or Firm — Kevin P. Crosby; GrayRobinson, P.A.

(57) ABSTRACT

An article carrying apparatus in the form of a support that is used with a shopping cart to provide a horizontal support for safely carrying loads that are longer than the length of the cart. The support may be used with any conventional shopping cart having nestable or non-nestable baskets. The support is hingedly attached to a lower structural member of the cart basket. The support is movable between a first position in which it lays flat against the bottom wall of the cart basket, allowing the basket to be nested into an adjacent cart, and a second position in which it is substantially resting against the front wall of the basket.

14 Claims, 13 Drawing Sheets

SHOPPING CART

BACKGROUND OF THE INVENTION

1. Field of the Invention

The present invention relates generally to shopping carts, and more particularly relates to shopping carts having structure for supporting articles which are longer than can otherwise safely be carried by the cart.

2. Background of the Invention

Shopping carts found in many home improvement and other stores need to be stored when not in use and can be nested to conserve space. This is done by the rear wall of the basket of the cart, underneath the push handle of the cart, being hinged nearest the handle and swinging forward and upward so that a front end of another cart may be pushed therein in a nesting fashion to conserve storage space. To permit this nesting operation the basket of the carts must be tapered, with the projected area of the front of the cart basket being smaller than the rear of the cart basket nearest the handle. Due to the tapered shape of the cart basket, a plane passing through both the handle and the top horizontal wire or edge of the front wall of the basket is not horizontal (i.e. is not parallel to the ground).

In some hardware and building goods stores, such nesting carts are utilized. In addition, larger flat bed and other carts designed to carry loads that are larger than the nestable carts normally carry are provided to carry lumber, plywood and other items that cannot fit into the conventional nestable carts. A problem exists in that, too often, the larger carts are all in use, so shoppers try to make do with the conventional nestable carts when they are purchasing one or a few pieces of larger items such as lumber and pipe that are long and do not fit well inside the cart. The shoppers position such longer items on top of the cart, supported by the handle of the cart and the top horizontal edge of the front wall of the basket. However, since the handle and the top edge of the front wall do not lie in a horizontal plane, the longer items sitting on top of the cart have a tendency to fall off or almost fall off and continuously need repositioning. Needless to say, this is a dangerous condition, and people get hurt when long loads positioned on top of the cart basket shift and fall due to their weight, or when they are inadvertently bumped and fall off the top of the cart basket. This also happens with non-nestable carts, the tops of which are level.

In the past, efforts have been devoted to attempt to remedy the aforementioned shortcomings in the shopping cart field. For example, U.S. Patent Application Publication No. US 2005/0212234 to McFarland discloses an attachment adapted to be connected to the upper end of the front wall of a shopping cart basket. The attachment includes a horizontal bar that is adapted to support a long load in a horizontal orientation on the cart. The attachment is hingedly connected to the front wall of the basket near an upper edge of the front wall so that the attachment can rotate between an upright position in which it can support a load to be carried by the cart and a stored position in which the attachment lies flat, in a vertical orientation, against the inside of the front wall of the basket. The attachment is not supported against the substantial horizontal loading imposed upon it by the loads which it is adapted to support. Consequently, the attachment is subject to easy failure.

U.S. Pat. No. 7,185,898 similarly discloses a support which is attached to the top edge of the front of a shopping cart basket, and includes a horizontal bar which is located in a horizontal plane coincident with the shopping cart handle when the support is attached to the cart in its in-use position. Like the support in the McFarland application, the support is attached at the top of the front wall of the basket. Consequently, forces exerted on the load being supported by the support and the handle which are imposed toward the rear of the cart will have a tendency to cause the support to rotate to its retracted position, which in turn would cause the load to fall.

U.S. Pat. No. 6,641,147 to Werner discloses, at FIG. 7, a support bracket having a pair of downwardly depending legs which fit within corresponding sockets in a plate attached to the front wall of the cart basket. The support includes a horizontal bar which resides in a horizontal plane coincident with the handle of the shopping cart. An upper bar limits the quantity of 2×4 pieces of lumber which can be accommodated by the support to one. The support of Werner cannot fold into a retracted position when the cart is nested within an adjacent cart. Therefore, in order to nest a cart with the support of Werner, one would have to manually lift the support out of the sockets prior to nesting of the carts. Such a requirement is unnecessary and cumbersome. Moreover, it permits for the misplacement of the support, as it is not attached to the basket.

Thus, there is a need in the art for a conventional type cart that can easily and safely be retrofitted or originally manufactured with a support structure which can safely support longer items that do not fit well inside the cart without interfering with the cart's ability to be nested within an adjacent cart

SUMMARY OF THE INVENTION

The present invention is a load carrying apparatus that is used with a shopping cart to provide a horizontal support for safely carrying loads that are longer than the length of the cart and must sit on top of the cart basket to be transported.

DESCRIPTION OF THE DRAWINGS

The invention will be better understood upon reading the following detailed description in conjunction with the drawings, in which.

DETAILED DESCRIPTION

Figure 1:
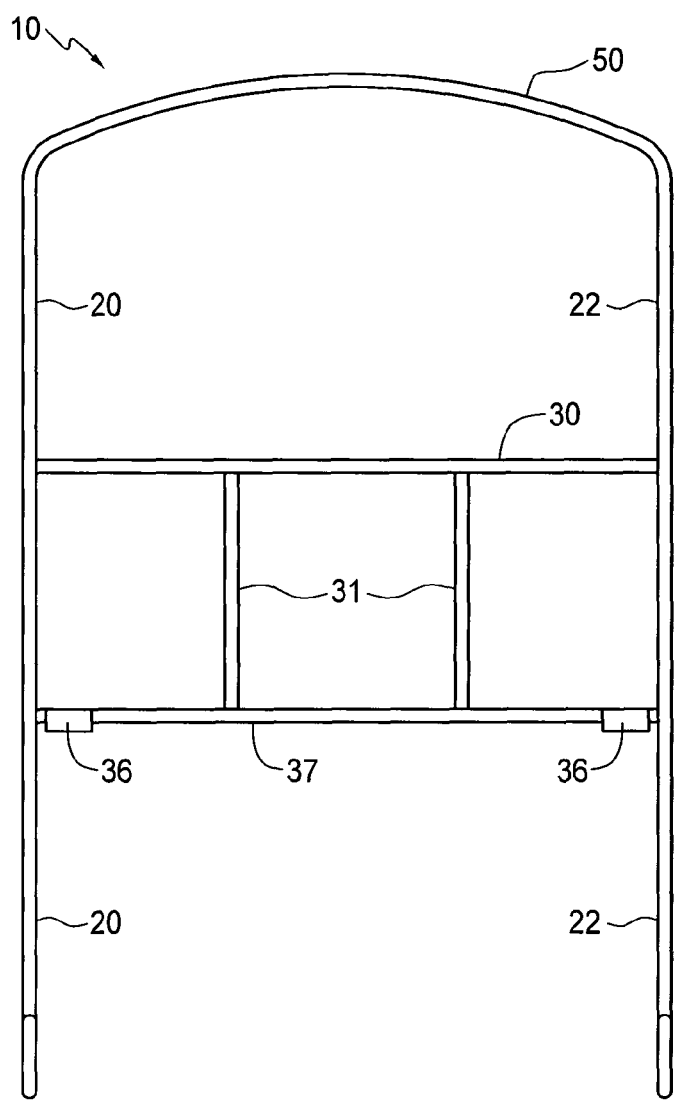
FIG. 1 is a front elevational view of a first embodiment of the article support of this invention.
Figure 2:
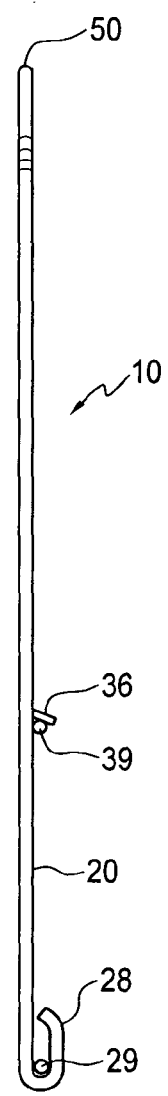
FIG. 2 is a left side elevational view thereof.

In this document, relational terms, such as "first" and "second," "top" and "bottom," and the like, may be used solely to distinguish one entity or element from another entity or element without necessarily requiring or implying any physical or logical relationship or order between such entities or elements. The terms "comprises," "comprising," or any other variation thereof are intended to cover a non-exclusive inclusion, such that a process, method, article, or apparatus that comprises a list of elements does not include only those elements, but may include other elements not expressly listed or inherent to such process, method, article, or apparatus. A claim element proceeded by the article "a" or "an" does not, without more constraints, preclude the existence of additional identical elements in the process, method, article, or apparatus that includes the element.

The present invention is a large or elongated article carrier and leveling device or support that may be used with any conventional shopping cart having nestable or non-nestable baskets, and is utilized for providing a level surface for safely carrying loads that are longer than the length of the cart and must sit on top of the cart basket to be transported.

The novel support may be built into the basket of a new cart or it may be retrofitted to an existing cart basket.

A shopping cart typically comprises a frame 2 having four wheels 6 and a push handle 40, and a basket 12 that is attached to frame 2. Basket 12 is comprised of a rear wall 8, front wall 14, bottom wall 16, and opposing sidewalls 15, 17. The cart shown in FIGS. 3-5, 7 and 9 is of the nesting type which allows for compact storage of a number of carts and, accordingly, basket 12 is tapered as is well known with its front wall 14 being smaller (e.g. shorter and narrower) than its rear wall 8. The result is that the uppermost structural member such as top wire 29, of basket 12 is not level. As nesting carriages are well-known in the art, details of how rear wall 8 swings forward and upward to provide an opening for nesting of carts 12 are not shown or described. In addition, the mesh work of the bottom and four side walls of basket 1 is not shown in full detail as those details are well known. Further, shopping carts in use today sometimes have baskets 12 made of a rigid, metal mesh (as shown in the Figures), and sometimes they are made of a molded, tough plastic mesh (not shown). It is to be understood that the invention described herein may be used with any such carts.

When the support is built into a new cart its elements are semi-permanently, hingedly, attached to the cart basket. When the support is to be retrofitted to an existing cart, the support is attached to the cart basket in exactly the same manner as it is installed during the original manufacturing of the cart.

The invention, in a first embodiment, comprises a supplemental support member 10 that is hingedly attached to a lowermost structural member such as lower horizontal wire 29 of the cart basket 12. The support is movable between a first position in which it lays flat against the bottom wall 16 of the cart basket (shown in FIG. 3), allowing the basket 12 to be nested into an adjacent cart, and a second position in which it is substantially resting against the front wall 14 of the basket (shown in FIG. 5). When a load such as pieces of 2×4 lumber L (shown in FIG. 5) longer than can fit inside the basket 12 are to be transported, the support member 10 is swung into the second position where it is releasably held against the front wall 14 of basket 12.

Figure 5:
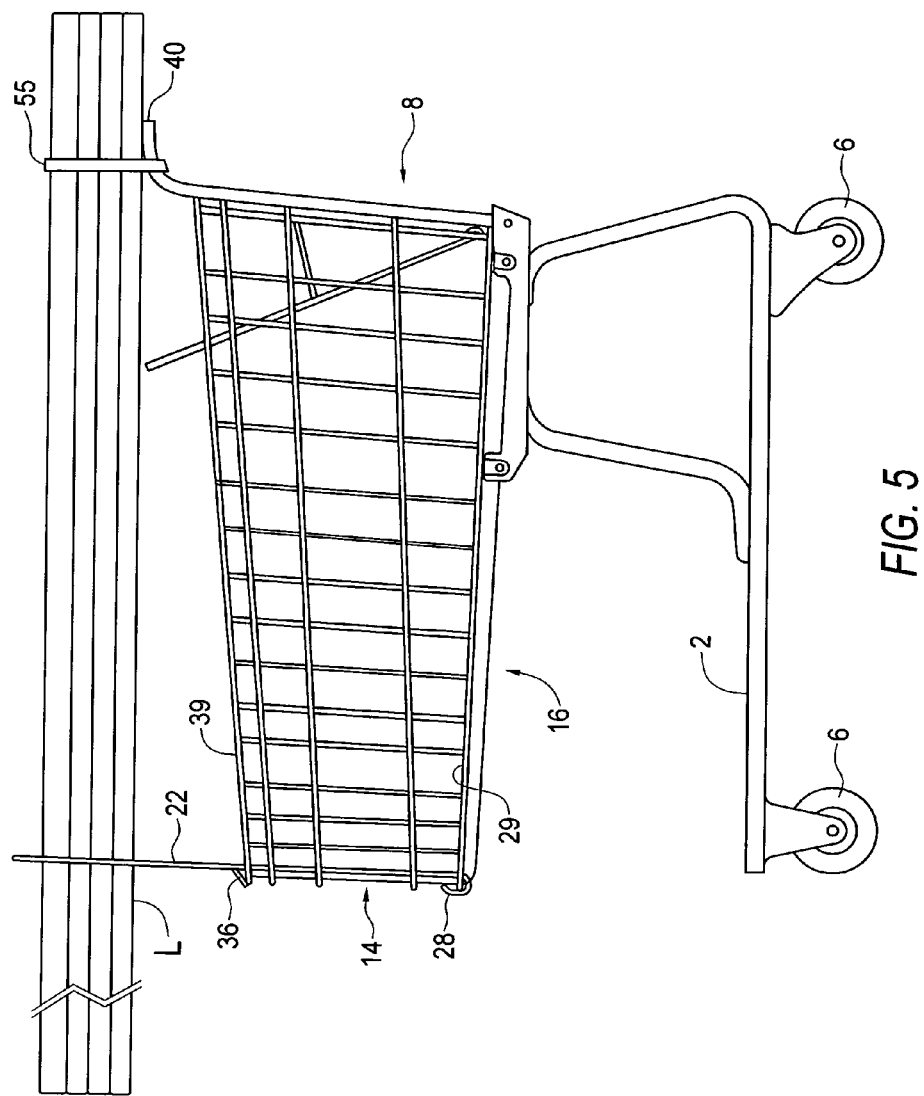
FIG. 5 is identical to FIGS. 3 and 4, but shows the support in the fully upright (i.e. in-use) position, and a plurality of large items being supported by the support of this invention and the shopping cart handle.
Figure 6:
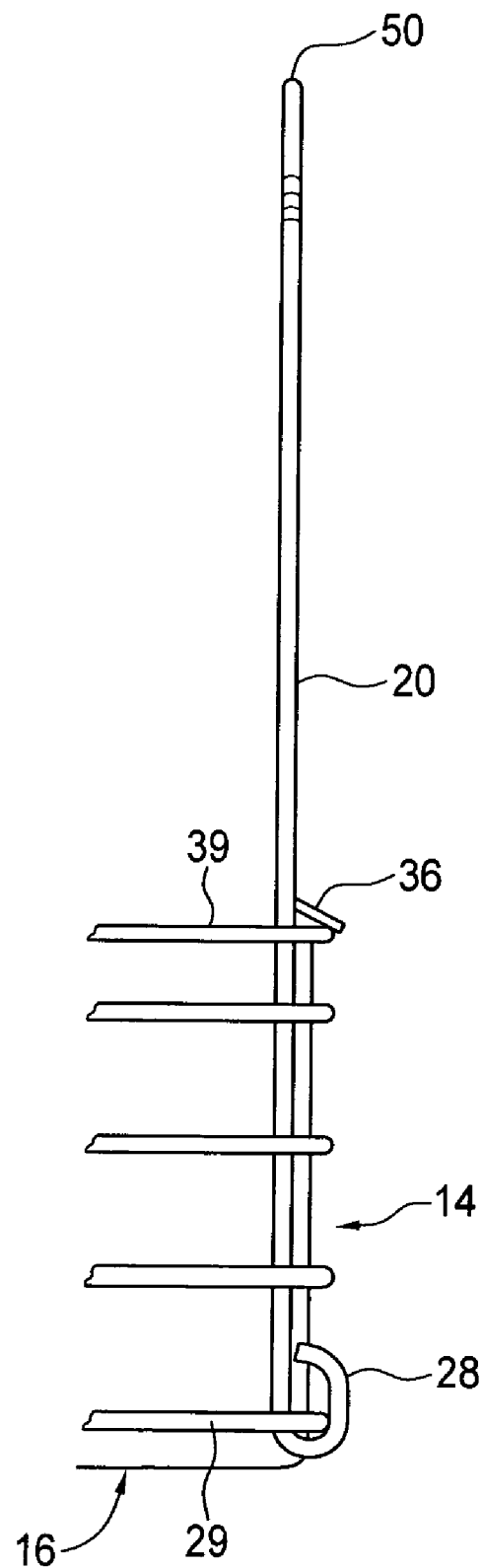
FIG. 6 is a left side partial elevational close-up view of a portion of the front of a shopping cart having attached thereto the support of the preferred embodiment of this invention.
Figure 7:
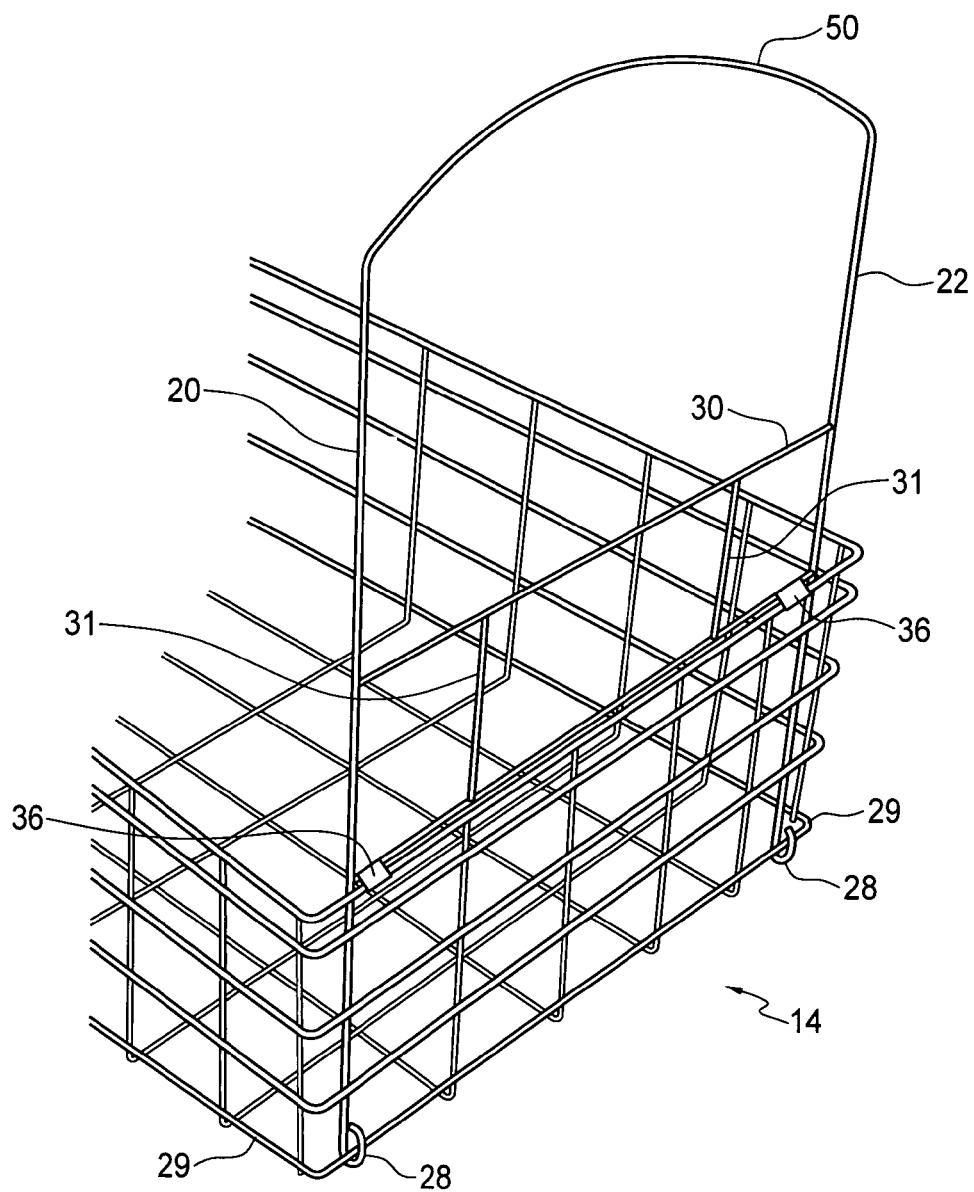
FIG. 7 is a left front perspective view of the support of the first embodiment of this invention.

The support member in its simplest form is preferably comprised of a pair of vertical legs 20, 22 which end at their lowermost ends 21, 23, respectively, in a loop or other structure 28 which wraps around corresponding wire 29 of the front or bottom wall of the cart basket 12, and at least one substantially horizontal cross bar 30 positioned between legs 20, 22 at a height which substantially corresponds to the height of the cart handle 40 such that the support bar and the handle lie in substantially the same horizontal plane when the support is oriented in the in-use position shown in FIG. 5. Thus, when a long load, such as lumber or pipe, sits on top of the handle 40 of the basket and on top of the cross bar 30, the load is oriented substantially horizontally and does not, therefore, easily fall off. Also, preferably, the legs 20, 22 extend above the height of the cross bar 30 to act as lateral retention members which hold the articles being carried from sliding off of the support member to the side. Still further, a top bar 50 extending between the uppermost ends of the legs 20, 22 may, preferably, but not by way of limitation, be employed to limit the area through which articles may be placed when being carried by the support member 10, and the top bar 50 may be arched or sloped to discourage the placement of any articles on top of the top bar 50, since the arched or sloped shape of the top bar will tend to cause any articles resting thereon to slide off.

To install support 10 on a preexisting shopping cart, loops 28 are opened up slightly to permit the ends of support legs 20, 22 to be placed about wire 29, and loops 28 then closed about wire 29. Alternatively, during manufacturing of a cart which will employ the support of this invention, wire 29 may be fed through loops 28 of support legs 20, 22. All that is required is for legs 20, 22 to be hingedly attached to wire 29. Alternatively, loops 28 may be connected to a one of the wires that makes up bottom wall 15 near the juncture of front wall 14 and bottom wall 15.

Figure 3:
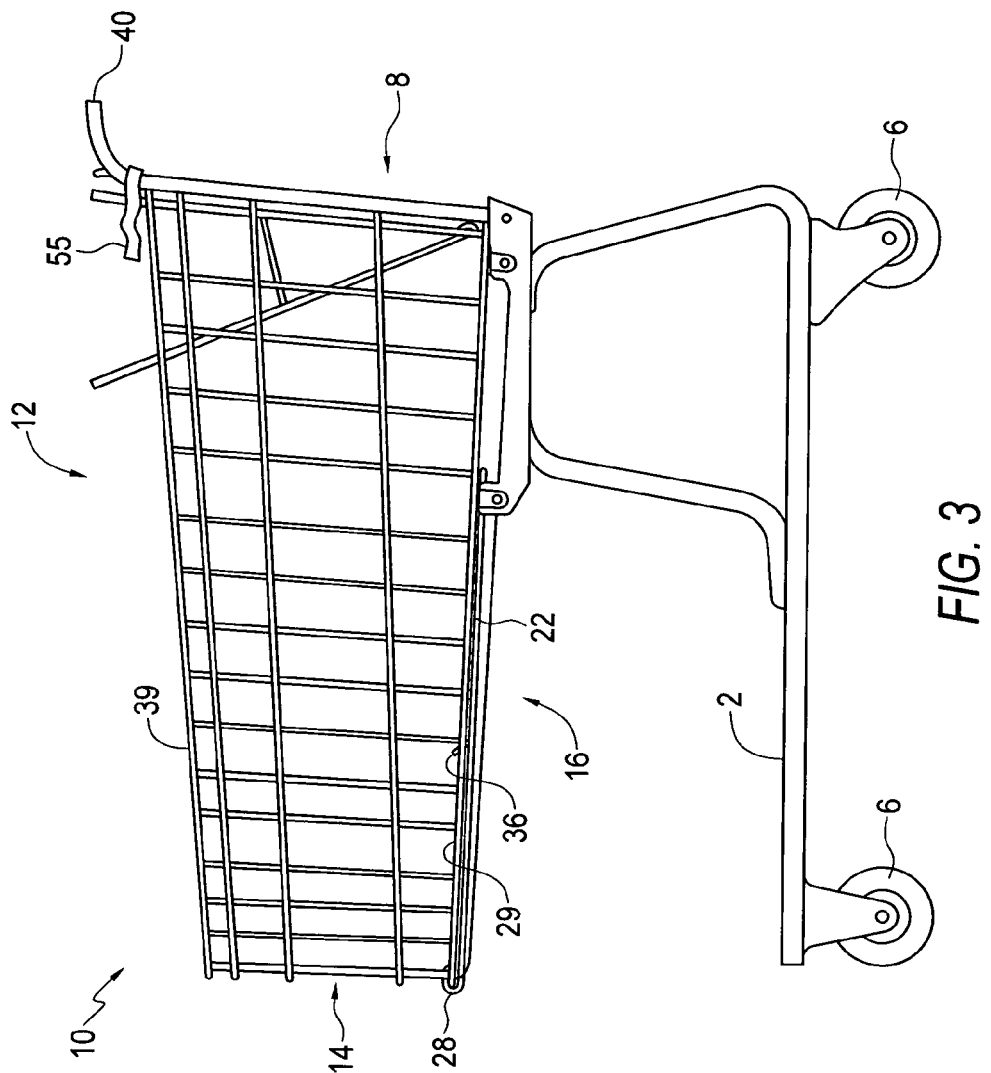
FIG. 3 is a right side elevational view of a conventional nesting type shopping cart showing a support of the invention hingedly connected thereto and residing in the fully retracted position.
Figure 4:
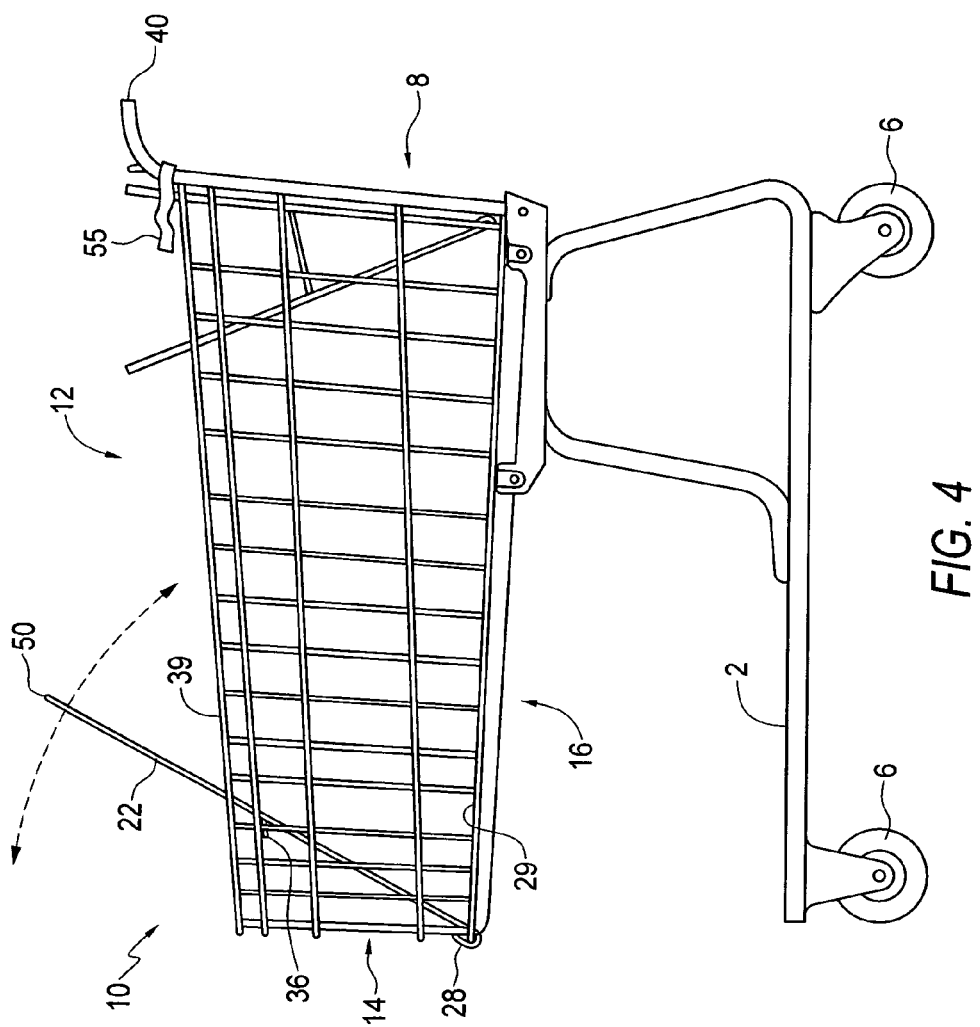
FIG. 4 is identical to FIG. 3, with the exception that the support is partially rotated into the upright, in-use, position.

Referring now to FIGS. 3-5, a side view of a conventional shopping cart with the support 10 of the first embodiment of the instant invention installed is shown. The shopping cart includes a frame 2 which is often made from tube steel. The frame 2 includes a handle 40 which is at the top rear of the shopping cart. A plurality of wheels 6 (usually two fixed in the rear and two caster type wheels in the front) is affixed to the base of said frame 2. A basket 12 is affixed to frame 2 of the shopping cart. The basket 12 has the general shape of an open topped box and is ordinarily made from welded wire.

Basket 12 is affixed forward of the handle 40 and above the wheels 6. The basket 12 includes a top bar 39 which runs around the top circumference of the basket 12. The basket 12 also includes a lower bar 29 which has the same general shape as the top bar 39 and is located near the bottom of basket 12. The support 10 of the instant invention is rotatably affixed to the front portion of the lower bar 29 of the shopping cart. A plurality of typical long items L are shown as being carried upon said handle 40 and the support 10 in FIG. 5.

FIG. 3 shows the support 10 in the fully retracted position, wherein it lays flat against the bottom 16 of cart 12. Thus, when not in use, the support is unobtrusively stored against the bottom of the cart, where if does not interfere with the carrying of articles to be purchased.

FIG. 4 shows the support 10 being rotated toward the in-use position, where it is being rotated about the interconnection of lower wire 29 of basket 12 and loops 28 of support legs 20, 22.

FIG. 5 shows the support 10 in the fully upright, in-use, position. One or more retention members attached to support 10, such as catches or tabs 36 attached to transverse member 37, releasably engage upper wire 39 of basket 12 to retain support 10 in the in-use position until sufficient force is exerted on support 10, as when basket 12 is pushed against an adjacent cart positioned in front of basket 12 to nest basket 12 into the adjacent cart. When support 10 is in the fully upright, in-use, position and a force is exerted upon it, catches 36 ride up over wire 39, causing support 10 to ride up along with it, until catches 36 clear wire 39, whereupon support 10 is free to rotate into the position shown in FIG. 3. Retention members 36 may also be attached directly to leg 20, leg 22, or both legs 20 and 22, such that cross member 37 may or may not be necessary at all.

Figure 8:
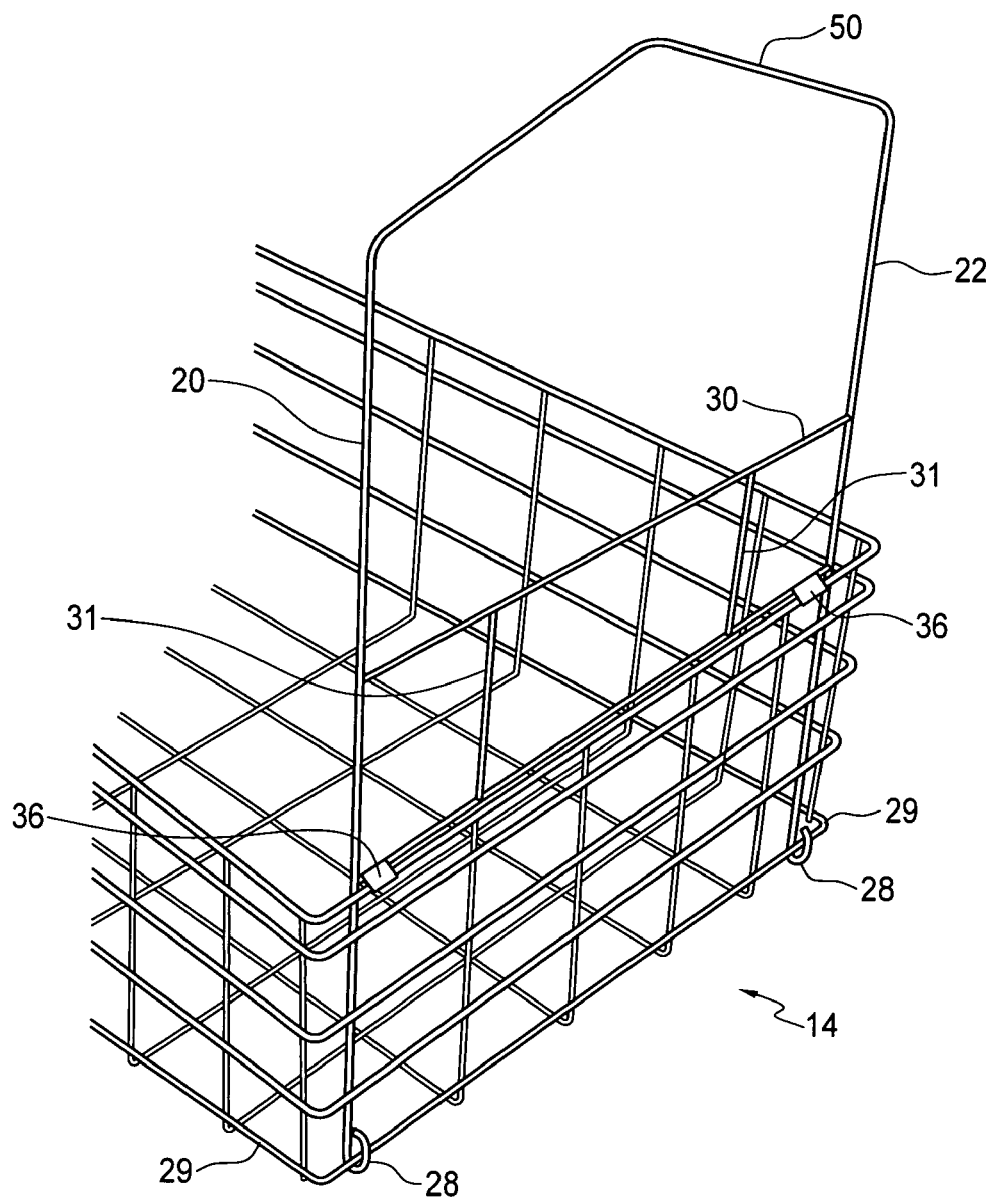
FIG. 8 is left side elevational view of the preferred embodiment of the support of this invention.
Figure 9:
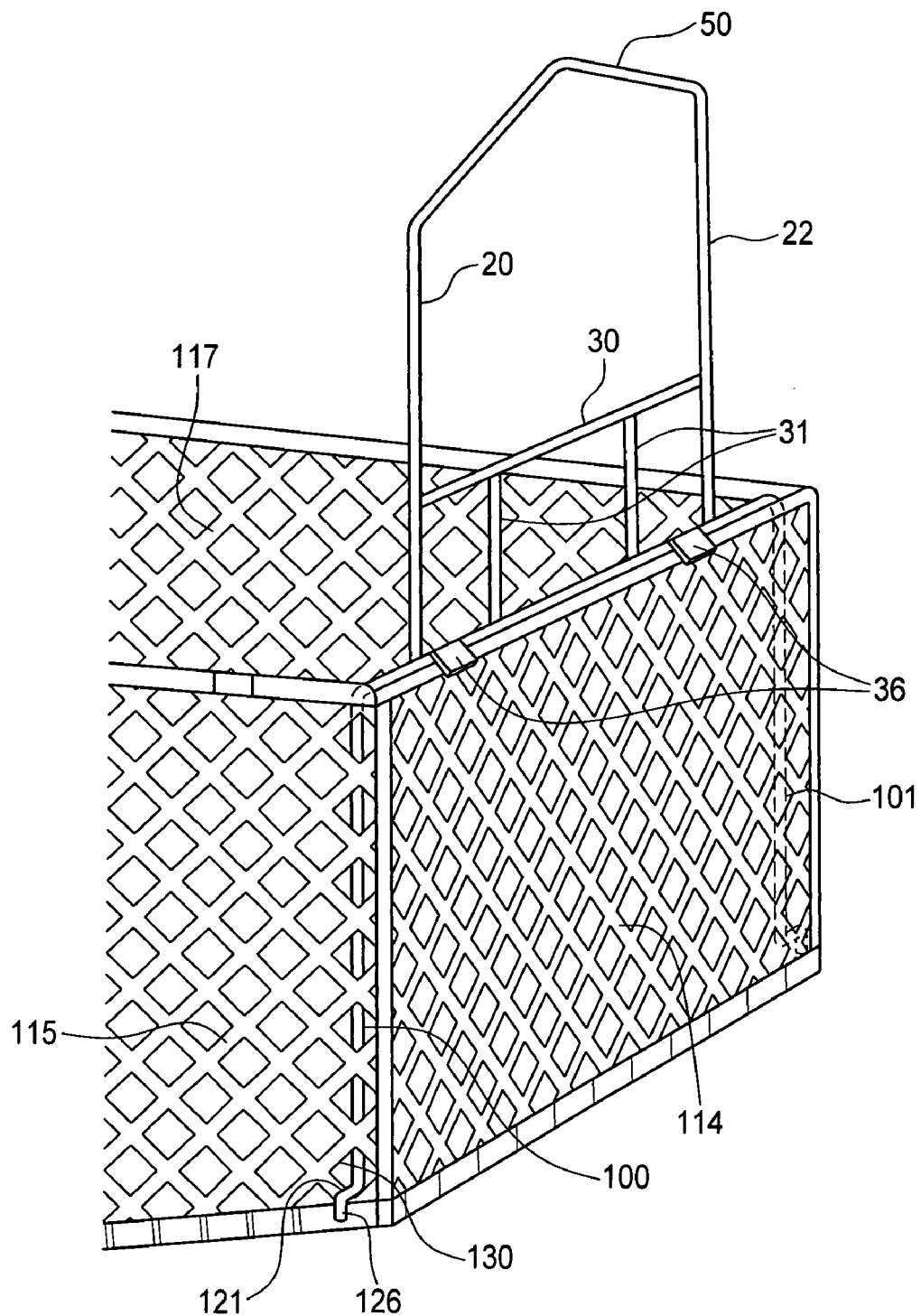
FIG. 9 is a left front perspective view of the support of an alternative embodiment of this invention, connected to a second type of cart.
Figure 10:
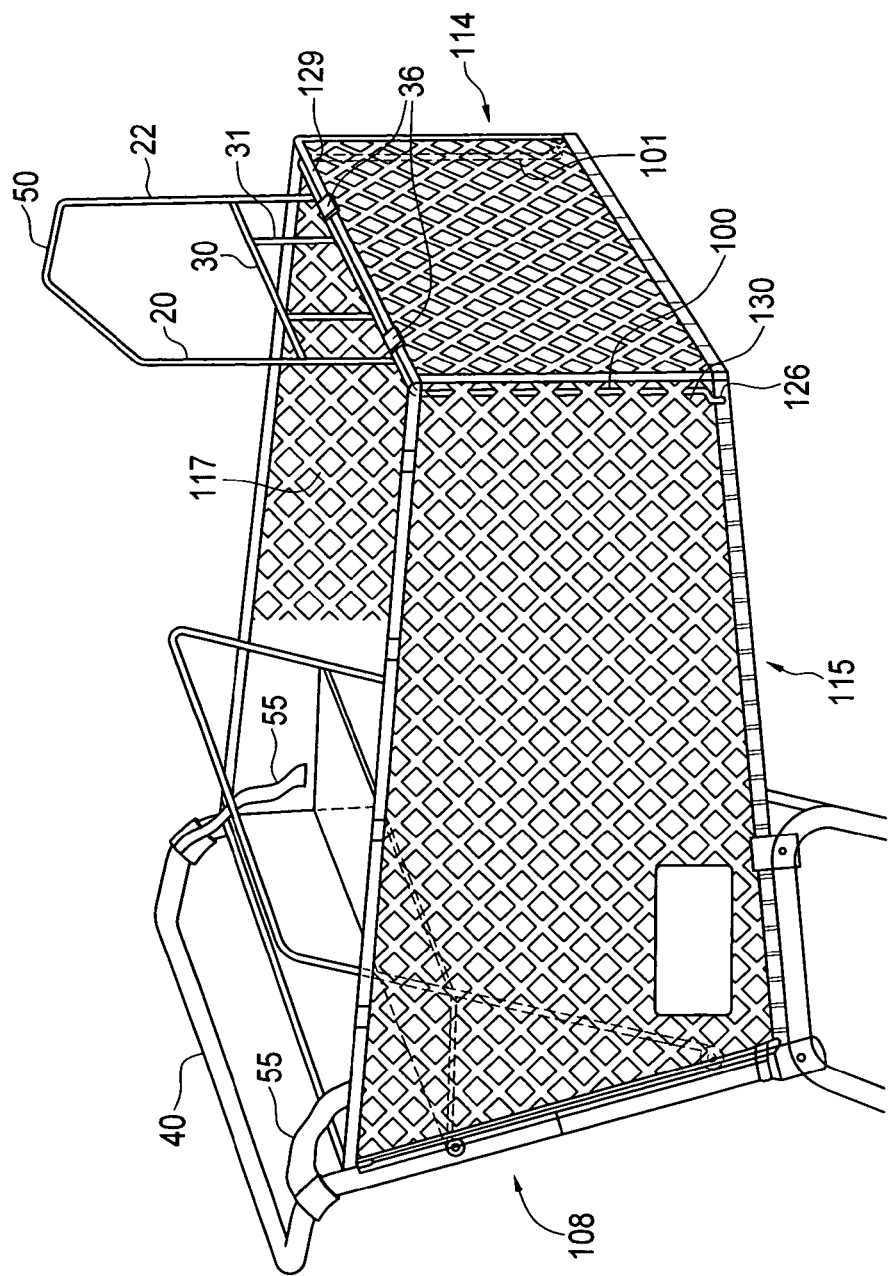
FIG. 10 is a left front perspective view of a full cart to which is mounted an alternative embodiment of this invention.

FIG. 8 depicts the preferred embodiment of the invention, which is essentially identical to the embodiment shown in FIGS. 1-7, with the exception that top bar 50 is formed into a peaked shape rather than the curved shape shown in FIGS. 1-7. The peaked shape provides even further safety in as much as articles placed on top of top bar 50 will tend to slide off, deterring the placement of articles L thereon.

An alternative embodiment of the invention, particularly adapted to be used with plastic shopping carts, is shown in FIGS. 9-13. In this embodiment, support 100 is similar support 10 shown in FIGS. 1-8 (either the curved version of top bar 50 as shown in FIGS. 1-7, or the top bar 50 shown in FIG. 8, may be used in connection with the embodiment shown in FIGS. 9-13), with the exception that bar 37 is extended on either side of the intersection thereof with legs 20 and 22, and connect at the outer most ends thereof to secondary support legs 102, 104. Alternatively, legs 20, 22 could be coextensive with legs 102, 104, which would widen the opening defined by support 30, legs 20, 22 and top bar 50 wider, which is contemplated to be within the scope of this invention. Legs 102, 104 (or, alternatively, legs 20, 22 if they are coextensive with legs 102, 104) are bent at their lowest most ends at bends 120, 122, respectively, at essentially a 90° angle, resulting in horizontal spindles 121, 123, which in turn may be bent at 126, 128 for the reason to be discussed more fully below.

As seen in FIGS. 9-10 and 12-13, the typical plastic shopping cart is includes a basket defined by a rear wall 108, left and right sidewalls 115, 117, a bottom wall 116 and a front wall 114. These walls are typically perforated, and, as can be seen in the drawings, a honey comb pattern is sometimes used, although other patterns of apertures are known in the art. All that is required for the invention to function with a plastic shopping cart is for there to be an aperture in the front lower most portion of sidewalls 115, 117 through which spindles 121, 123 are passed, by either deflecting legs 102, 104 sufficiently to permit spindles 121, 123 to be placed into the apertures 130, 132 and held in place therewithin by the spring-like action of legs 102, 104. In use, support 100 rotates about spindles 121, 123 within apertures 130, 132 between a first, fully lowered position in which support 100 lays substantially flat against the interior of the bottom 115 of the cart, and a second, in-use position (shown in FIGS. 9-10 and 12-15). Bent ends 126, 128 act to assist the retention of spindles 121, 123 within apertures 130, 132, respectively, although they are not required to accomplish the purpose of this invention. Alternatively, attachment structure such as loops 28 may be connected to the lower ends of legs 102, 104 to permit attachment of support 10 to front wall 114 or bottom wall 115 near the juncture of front wall 114 and bottom wall 115.

Figure 11:
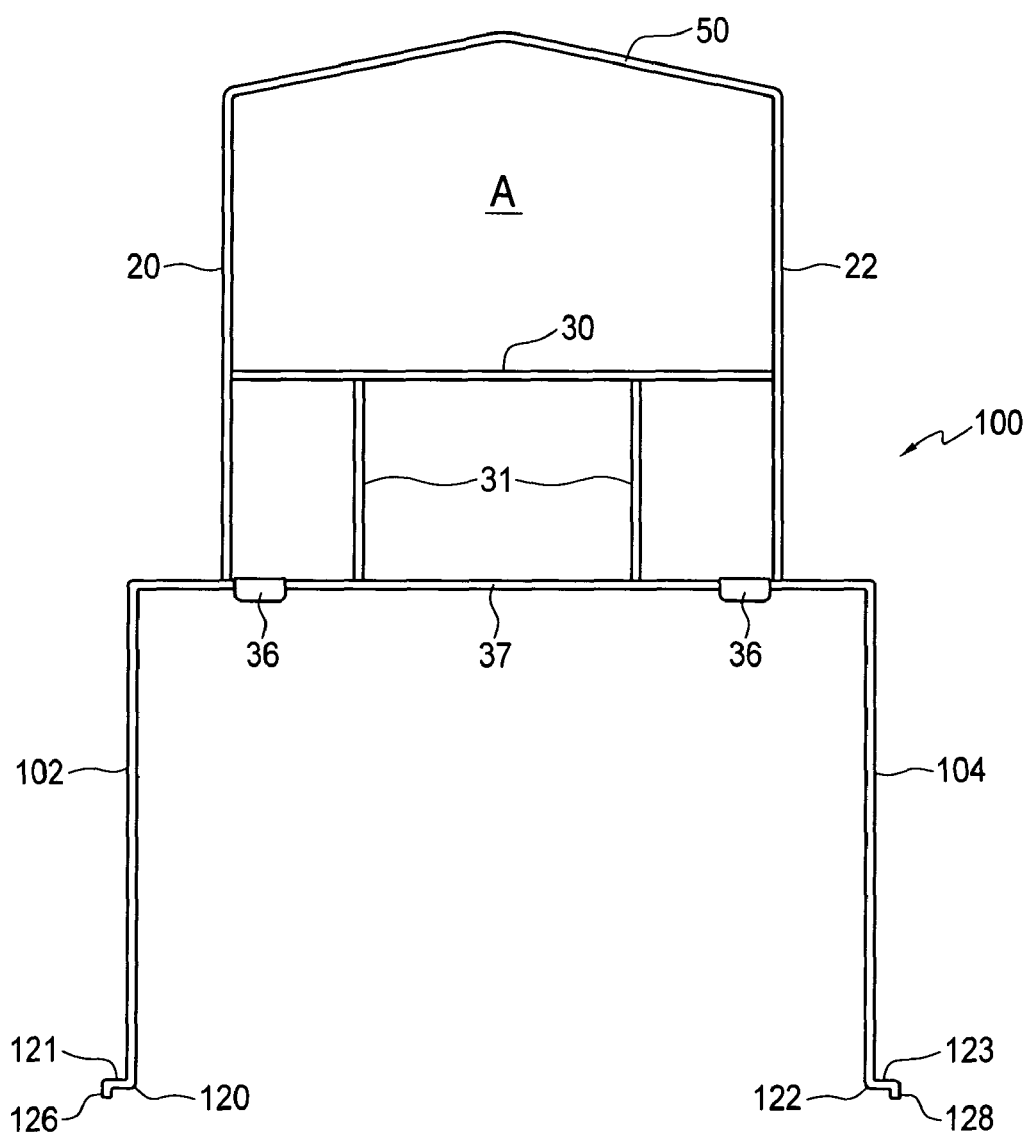
FIG. 11 is a front elevational view of the alternative embodiment of the invention.
Figure 12:
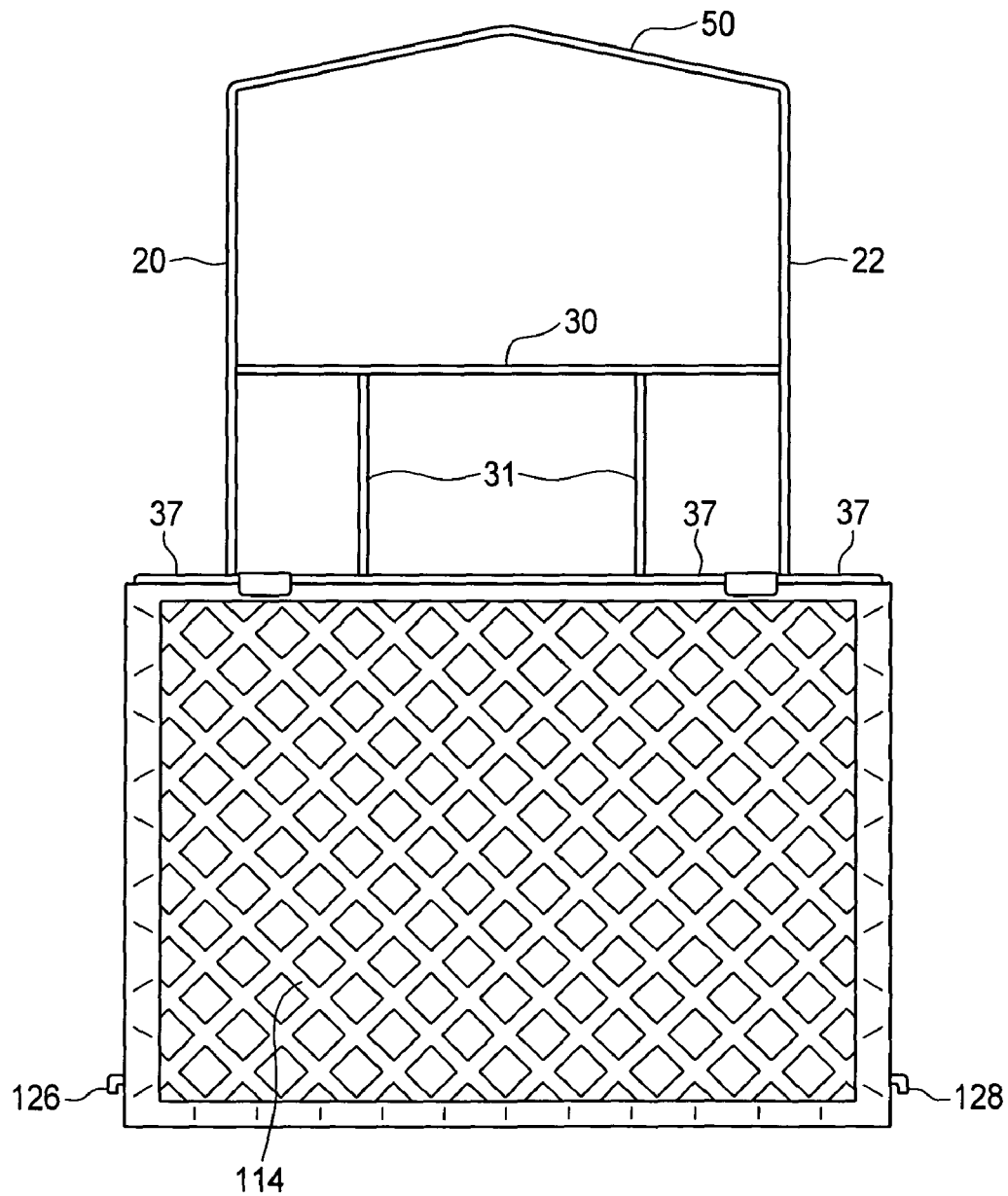
FIG. 12 is a front elevational view of the alternative embodiment of this invention installed within the second type of cart shown in FIGS. 9-10.
Figure 13:
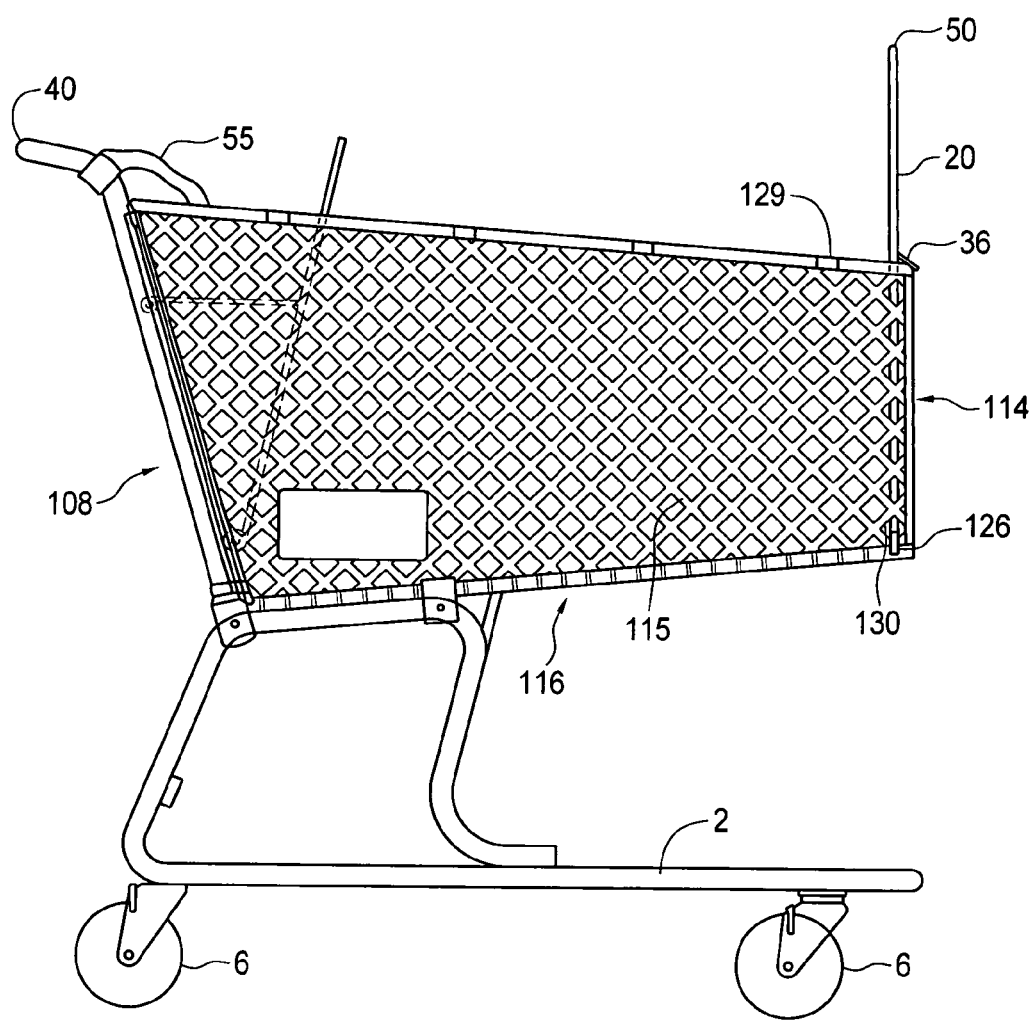
FIG. 13 is a left side elevational view of the second type of cart having installed therein in the in-use position the support of the alternative embodiment of this invention.
Figure 14:
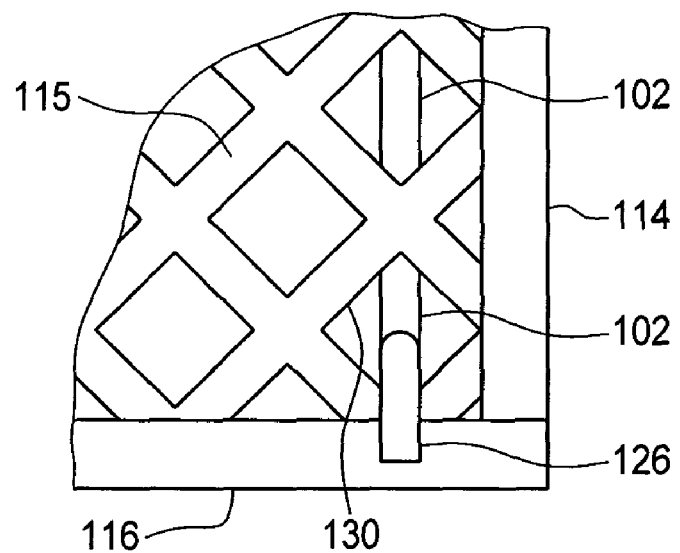
FIG. 14 is a close up of the area of detail to the lower right of the basket in FIG. 13.
Figure 15:
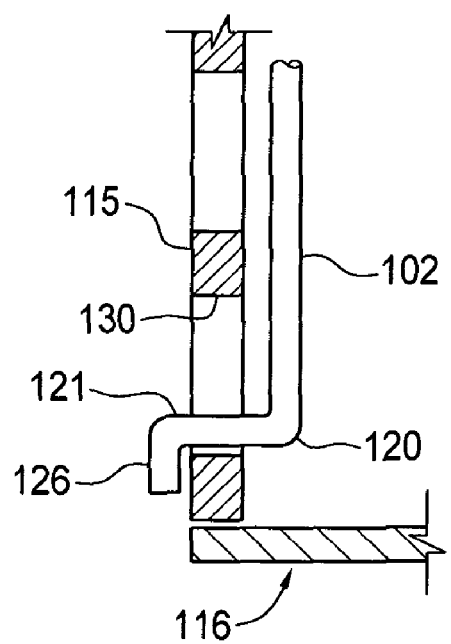
FIG. 15 is a cross sectional front elevational view of the area of detail shown in FIG. 14.

As stated previously, it is to be understood that legs 20, 22 may be coextensive (i.e. collinear) with legs 102, 104 such that spindles 121, 123 will be configured at the position they are at in the drawings, but they will be attached to legs 20, 22 such that the areas defined by legs 20, 22, support bar 30 and top bar 50 will be larger than that shown in FIG. 11. However, it is deemed preferable, but not necessary, to limit the size of the area A to limit the amount of articles, and hence weight, that can be imposed on support bar 30.

Top bar 50 may be peaked as shown in FIGS. 9-13, may be curved as shown in FIGS. 1-7, or may even be straight (not shown).

Thus, it can be seen that any suitable attachment structure, such as spindles 121, 123, loops 28, or the like, can be employed to rotatably connect support 10 to a shopping cart, whether the cart is made of metal wires or plastic structural members, or any combination the two.

For all embodiments, retention tabs 36 may be positioned anywhere on legs 20 and/or 22. All that is necessary is that the one or more retention tabs that are employed line up with a structural member, such as wire 39, of the front wall 14 or sidewalls 15, 17 (or 115, 117) of the cart basket. In other words, tabs 36 may be connected to legs 20, 22 at points which are lower on legs 20, 22 than shown in the drawings so long as tabs 36 line up with another wire or structural member of front wall 14 or sidewalls 15, 17 (or 115, 117) to be able to engage such other wire or structural member to releasably retain support 10 in the in-use position shown in FIGS. 5-10 and 12-15. Therefore, tabs 36 may be positioned on legs 20, 22 such that they extend to the sides, not toward front wall 14, of the basket, and releasably engage corresponding wires or other structural members of the sidewalls basket. Also, retention tabs 36 may extend the entire length of wire 37, so that they will essentially form a single retention tab. Alternatively, retention tabs 36 may be positioned anywhere on wire 37, so long as they function to reliable retain supports 10, 100 in the in-use position and support the weight load imposed by articles L.

It is also to be understood that the attachment structure such as loops 28 or spindles 121, 123 need not necessarily be connected to the lowermost structural member such as wire 29 of a metal cart or apertures 130, 132 of a plastic cart. All that is necessary is that the attachment structure connect to the cart basket at points at or near the intersection of front wall 14 or 114 and bottom 16 or 116 of the basket so that the support 10 can rotate from a position where it lays substantially flat against the bottom wall 16 or 116 of the basket to a position where it lays substantially flat against the front wall 14 or 114.

As discussed previously, strap 55 is attached to either side of the handle and is wrapped around the articles "L" when they are on the cart handle 40. Such a strap is currently used on existing carts as a seat belt for children riding in the child seat on the cart. The strap used on this invention will either be a longer strap than the existing one or will attach to the existing one as an extension.

For all embodiments of the invention, the area(s) bounded by support legs 20, 22, intermediate supports 31, and upper and lower cross bars 30, 37 may be used to display advertising, safety or warning messages, or other informational matter (not shown).

In the foregoing specification, the present invention has been described with reference to specific embodiments. However, one of ordinary skill in the art will appreciate that various modifications and changes may be made without departing from the spirit and scope of the present invention as set forth in the appended claims. Accordingly, the specification and drawings are to be regarded in an illustrative rather than a restrictive sense, and all such modifications are intended to be included within the scope of the present invention.

The invention claimed is:

1. A support for holding elongated articles in a shopping cart, the shopping cart being characterized as having a handle, and a basket formed of a plurality of wires arranged to define a shopping cart basket, the basket having an upper basket edge defined by an uppermost wire, the basket having a lower basket edge defined by a lowermost wire, and the basket including a front wall and a bottom wall, the support comprising:

first and second support legs, each support leg having a cart attachment member connected to its lowermost end; and an upper crossbar connected between an upper end of the first support leg and an upper end of the second support leg;

a first middle crossbar connecting the first and second support legs to each other;

a second lower crossbar connecting the first and second support legs to each other;

at least one retention tab connected to the second lower crossbar for releasably engaging the uppermost wire of the basket;

each attachment member rotatably connecting the support to the lowermost wire so that the support can rotate between a first, retracted, position where it is laying substantially flat against the bottom of the basket and a second, in-use, position, where it is releasably held adjacent the front wall by the interconnection of the at least one retention tab and the uppermost wire; a finite sized open area bounded by the support legs, the upper crossbar and the middle crossbar through which can be placed elongated articles in a substantially horizontal orientation when said support is in the in-use position, the middle crossbar lying in substantially the same horizontal plane as the handle such that elongated article(s) placed on the handle and the middle crossbar will lie substantially horizontal and above the middle crossbar and in the open area;

the entirety of the upper crossbar being arched or sloped substantially non-parallel relative to the first middle crossbar to cause any articles placed thereon to slide off;

the first and second support legs being positioned adjacent an interior facing side of the uppermost wire so as to prevent the support from being moved to a position external to the uppermost wire.

2. The support of claim 1, wherein the attachment structure comprises a loop formed out of the lowermost end of each support leg.

3. The support of claim 1, wherein the attachment structure comprises a generally horizontally disposed spindle connected to the lowermost end of each support leg, each spindle adapted to cooperate with a corresponding aperture defined by a structural member of the cart.

4. A support for holding elongated articles in a shopping cart, the shopping cart being characterized as having a handle, and a basket formed of a plurality of structural members arranged to define a shopping cart basket, the basket having an upper basket edge defined by an uppermost structural member, the basket having a lower basket edge defined by a lowermost structural member, and the basket including a front wall and a bottom wall, the support comprising:

first and second support legs, each support leg having a cart attachment structure connected to its lowermost end; and an upper crossbar connected between an upper end of the first support leg and an upper end of the second support leg;

a first middle crossbar connecting the first and second support legs to each other;

at least one retention tab connected to the support for releasably engaging the uppermost structural member;

each attachment structure rotatably connecting the support to the lowermost structural member so that the support can rotate between a first, retracted, position where it is laying substantially flat against the bottom of the basket and a second, in-use, position, where it is releasably held adjacent the front wall by the interconnection of the at least one retention tab and the uppermost structural member; a finite sized open area bounded by the support legs, the upper crossbar and the middle crossbar through which can be placed elongated articles in a substantially horizontal orientation when said support is in the in-use position, the middle crossbar lying in substantially the same horizontal plane as the handle such that elongated article(s) placed on the handle and the middle crossbar will lie substantially horizontal and above the middle crossbar and in the open area;

the entirety of the upper crossbar being arched or substantially non-parallel relative to the first middle crossbar sloped to cause any articles placed thereon to slide off;

the first and second support legs being positioned adjacent an interior facing side of the uppermost wire so as to prevent the support from being moved to a position external to the uppermost wire.

5. The support of claim 4, wherein the attachment structure comprises a loop formed out of the lowermost end of each support leg.

6. The support of claim 4, wherein the attachment structure comprises a generally horizontally disposed spindle connected to the lowermost end of each support leg, each spindle adapted to cooperate with a corresponding aperture defined by a structural member of the cart.

7. A support for holding elongated articles in a shopping cart, the shopping cart being characterized as having a handle, and a basket formed of a plurality of structural members arranged to define a shopping cart basket, the basket having an upper structural member, the basket having a lower structural member, and the basket including a front wall and a bottom wall, the support comprising:

first and second support legs, each support leg having a cart attachment member connected to its lower end; and an upper crossbar connected between the uppermost end of the first support leg and the uppermost end of the second support leg;

a first middle crossbar connecting the first and second support legs to each other;

at least one retention tab connected to the first or second leg for releasably engaging the upper structural member;

each cart attachment member being rotatably connected to the lower structural member so that the support can rotate between a first, retracted, position where it lays substantially flat against the bottom of the basket and a second, in-use, position, where it is releasably held adjacent the front wall by the interconnection of the at least one retention tab and the upper structural member; a finite sized open area bounded by the support legs, the upper crossbar and the middle crossbar through which can be placed elongated articles in a substantially horizontal orientation when said support is in the in-use position, the middle crossbar lying in substantially the same horizontal plane as the handle such that elongated article(s) placed on the handle and the middle crossbar will lie substantially horizontal and above the middle crossbar and in the open area;

the entirety of the upper crossbar being arched or sloped substantially non-parallel relative to the first middle crossbar to cause any articles placed thereon to slide off;

the first and second support legs being positioned adjacent an interior facing side of the uppermost wire so as to prevent the support from being moved to a position external to the uppermost wire.

8. The support of claim 7, wherein the attachment member comprises a loop attached to the lowermost end of each support leg.

9. The support of claim 7, wherein the attachment member comprises a generally horizontally disposed spindle connected to the lowermost end of each support leg, each spindle adapted to hingedly cooperate with a corresponding aperture defined by a structural member of the cart, said aperture located adjacent the bottom wall of the basket.

10. The support of claim 9, wherein the aperture corresponding to each spindle is an aperture defined by a respective sidewall of the basket.

11. The support of claim 9, wherein each aperture corresponding to each spindle is an aperture defined by the front wall of the basket.

12. The support of claim 1, wherein the open area is free of any wires.

13. The support of claim 4, wherein the open area is free of any wires.

14. The support of claim 7, wherein the open area is free of any wires.

* * * * *